United States Patent [19]

Huang

[11] Patent Number: 5,677,799
[45] Date of Patent: Oct. 14, 1997

[54] LENS ASSEMBLY WITH ADJUSTABLE FOCUSING ARRANGEMENT

[75] Inventor: Shyi-Yuan Huang, Taipei, Taiwan

[73] Assignee: Silitek Corporation, Taipei, Taiwan

[21] Appl. No.: 753,333

[22] Filed: Nov. 22, 1996

[51] Int. Cl.$^6$ .................................................. G02B 7/02
[52] U.S. Cl. ....................................................... 359/819
[58] Field of Search .................................. 359/819, 811, 359/812, 813, 822, 823, 829, 806

[56] References Cited

U.S. PATENT DOCUMENTS

| | | | |
|---|---|---|---|
| 3,765,759 | 10/1973 | Yamada | 355/45 |
| 3,884,551 | 5/1975 | Bernier | 350/142 |
| 4,162,820 | 7/1979 | Schwab et al. | 350/36 |
| 4,618,221 | 10/1986 | Thomas | 350/566 |
| 4,859,029 | 8/1989 | Durell | 359/629 |
| 5,111,476 | 5/1992 | Hollenbeck et al. | 372/107 |
| 5,136,433 | 8/1992 | Durell | 359/829 |
| 5,465,126 | 11/1995 | Fukuda | 353/101 |

*Primary Examiner*—Georgia Y. Epps
*Assistant Examiner*—Ricky Mack
*Attorney, Agent, or Firm*—Beveridge, DeGrandi, Weilacher & Young LLP

[57] ABSTRACT

A lens assembly with adjustable focusing arrangement generally comprises a lens assembly which includes a supporting barrel having the lens unit disposed therein. The outer wall of the supporting barrel is slidably disposed with an adjusting knob. A barrel housing which is defined by a stationary housing and a movable housing is provided and the lens assembly, the supporting barrel and the adjusting knob are received within the barrel housing with its receiving chamber. Both sides of the barrel housing are provided with cutout for readily accessing to the adjusting knob. An aperture is provided at the front of the receiving chamber. The inner wall of the receiving chamber of the barrel housing is provided with a pair of guiding rails extending lengthwise which can be slidably engaged with the guiding grooves of the supporting barrel. The focus can be readily attained by rotating the adjusting knob. The barrel housing is provided with a locking screw to fix the focus attained. The lens assembly with adjustable focusing arrangement features a simplified structure and readily adjustment.

4 Claims, 4 Drawing Sheets

LENS ASSEMBLY WITH ADJUSTABLE FOCUSING ARRANGEMENT

FIELD OF THE INVENTION

The present invention relates to a lens assembly with adjustable focusing arrangement which is specially suitable in use with a scanner. The focus can be accurately and readily adjusted to attain an optimal image.

DESCRIPTION OF PRIOR ART

In the conventional optical scanner, a lens is disposed between the CCD device (charge coupled device) and the document to be scanned. Before the lens is installed and fixed, it shall be accurately focused to ensure a better image result. In the conventional structure, an axial adjusting device is provided in the housing of the lens. When the desired focus is attained, the adjusting device is fixed by a screw member.

Nevertheless, the focusing adjustment is performed by displacing the lens within the housing by the axial adjusting device. Since the focusing is an accurate adjustment, it is hard to get the optimal result with the existed adjusting device. By the way, the manipulate of the existed adjusting device is laboriously and costly. It has become a bottle neck in the production line.

SUMMARY OF THE INVENTION

It is the object of this invention to provide a lens assembly with adjustable focusing arrangement which is specially suitable in use with a scanner. By this provision of the present invention, the problem encountered by the existed adjusting device can be therefore completely solved.

In order to achieve the object set forth, the lens assembly with adjustable focusing arrangement made according to this invention comprises an adjustable knob disposed at the outer wall of the barrel which has lens disposed therein. When the adjusting know is rotated, the barrel and the lens are moved axially accordingly. By this arrangement, the focus can be readily adjusted and the optimal image can be attained.

Since the adjustment can be readily attained by manipulating the adjusting knob, the adjustment of the focus is more effective as compared with the conventional adjusting device. Accordingly, the assembling can be quickly and readily done. The manufacturing cost is therefore reduced.

BRIEF DESCRIPTION OF THE DRAWINGS

In order that the present invention may more readily be understood the following description is given, merely by way of example with reference to the accompanying drawings, in which.

Figure 1:
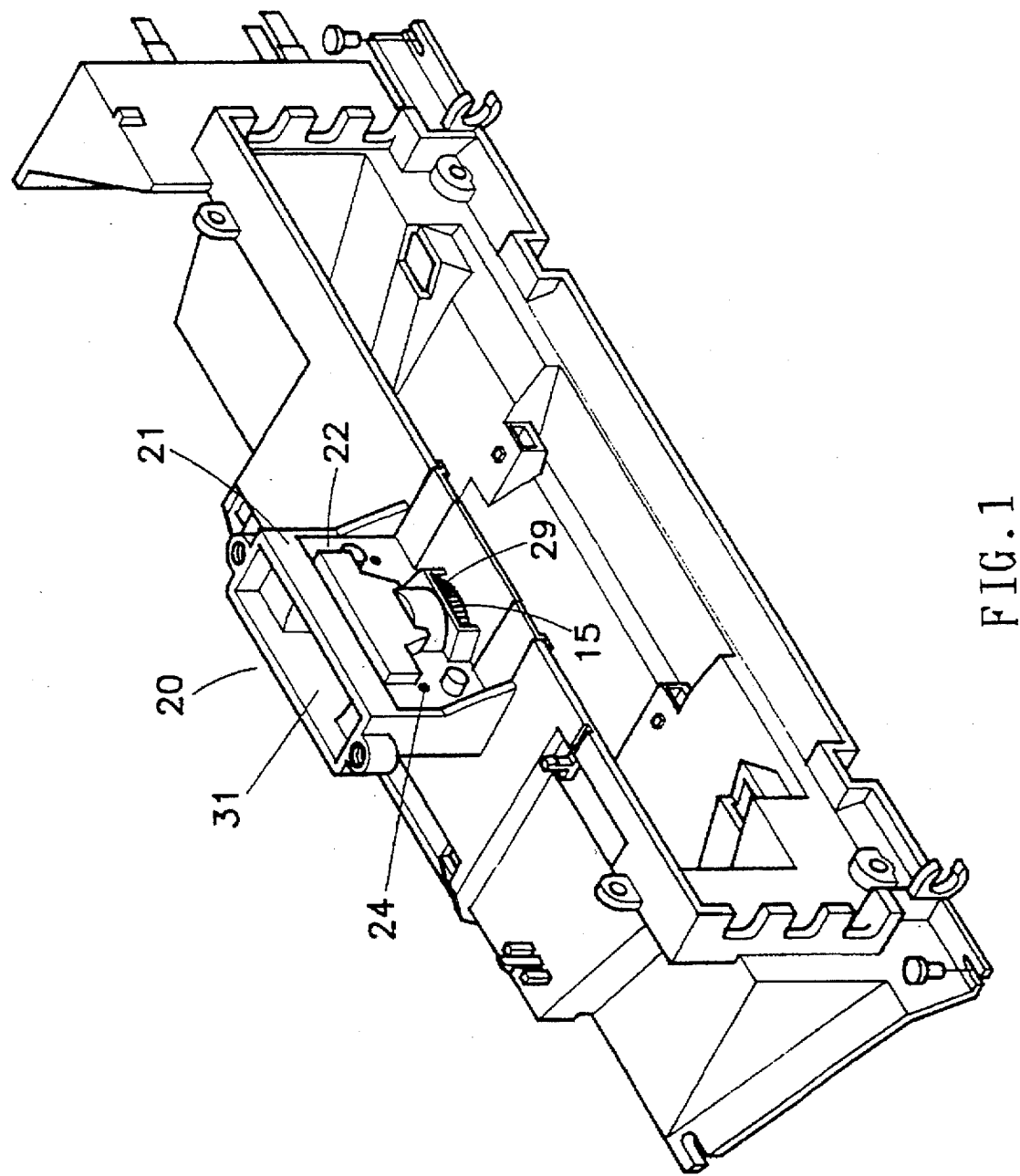
FIG. 1 is a perspective view of the lens assembly with adjustable focusing arrangement made according to this invention.

DESCRIPTION OF THE REFERENCE 10 lens assembly
11 lens unit
12 supporting barrel
13 external thread
14 guiding groove
15 adjusting knob
16 stops
17 inner thread
18 positioning ring
19 guiding rail
20 barrel housing
21 stationary housing
22 sliding housing
23 dowel
24 dowel hole
25 through hole
26 threaded hole
27 screw
28 receiving chamber
29 cutout
30 positioning slot
31 aperture
32 threaded hole
33 locking screw
40 mirrors chamber
41 reflecting mirror
42 reflecting mirror
43 reflecting mirror
44 reflecting mirror
45 CCD element
46 document

DETAILED DESCRIPTION OF PREFERRED EMBODIMENT

Figure 2:
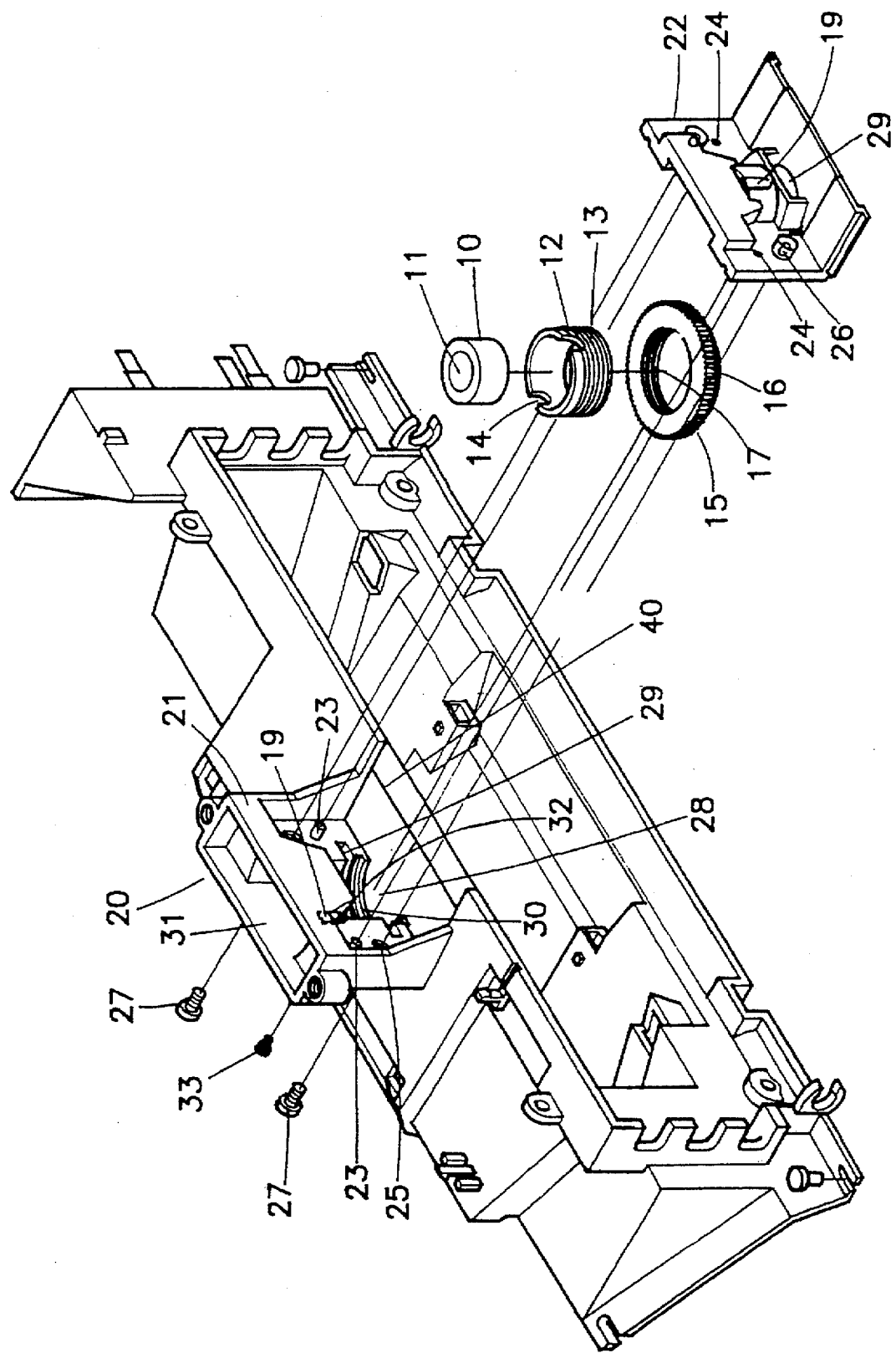
FIG. 2 is an exploded perspective view of the lens assembly with adjustable focusing arrangement made according to this invention.
Figure 3:
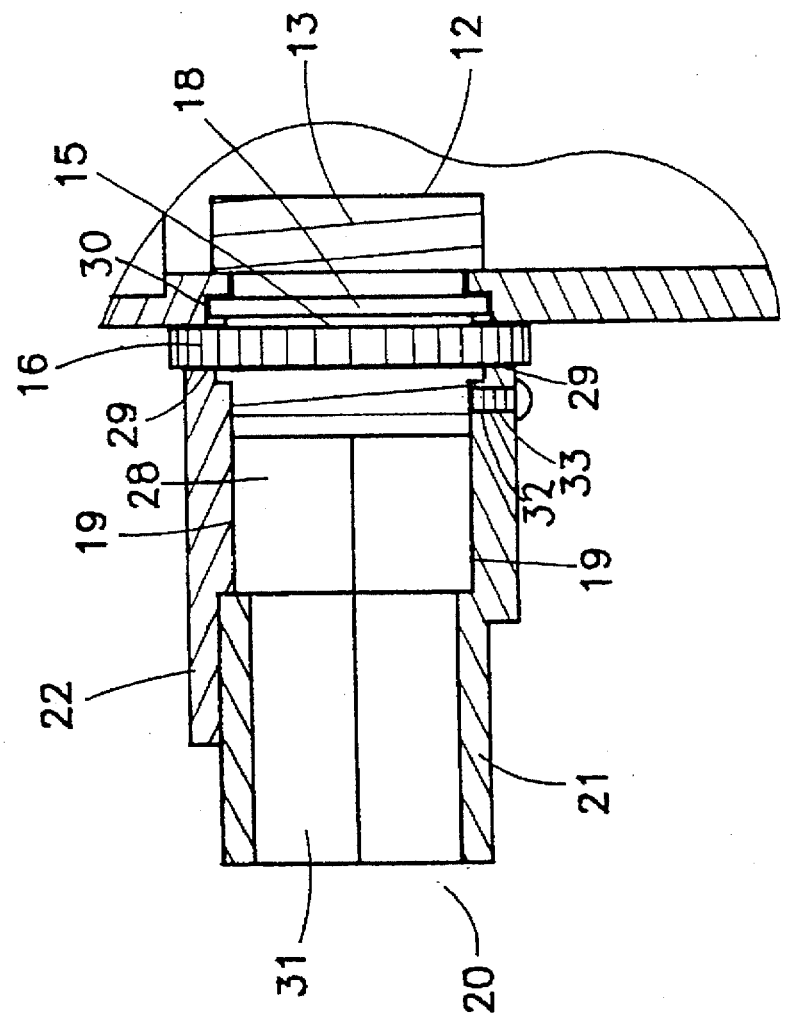
FIG. 3 is a cross sectional view of the lens assembly with adjustable focusing arrangement shown in FIG. 1.

Referring to FIGS. 1, 2 and 3 show the perspective view, exploded view and cross sectional view of the lens assembly with adjustable focusing arrangement made according to this invention respectively. The adjustable focusing arrangement generally comprises a lens assembly 10 which includes a supporting barrel 12 having the lens unit 11 disposed therein. The outer wall of the supporting barrel 12 are provided with thread 13 and a pair of guiding grooves 14 extending lengthwise. An adjusting knob 15 having an inner thread 17 which can be slidably engaged with the external thread 13 of the barrel 12 is provided. The outer rim of the adjusting knob 15 is also provided with stops 16 for an frictional engagement with the fingers of the operator. The adjusting knob 15 is engaged with a positioning ring 18 such that when the adjusting knob 15 is rotated, the barrel 12 can be moved axially up and down as the result of the inner thread 17 and the external thread 19.

The lens assembly 10, the supporting barrel 12 and the adjusting knob 15 are jointly installed within the barrel housing 20 of the scanner. The barrel housing 20 is divided into a stationary housing 21 and a movable housing 22 which jointly define the barrel housing 20. The stationary housing 21 and the movable housing 22 are provided with dowel 23 and dowel hole 24 corresponding to each other. The stationary housing 21 and the movable housing 22 are also provided with through hole 25 and threaded hole 26.

The barrel housing 20 is defined with a receiving chamber 28 to receive the lens assembly 10 and the supporting barrel 12 therein. Both sides of the barrel housing 20 are provided with cutout 29 for readily access to the adjusting knob 15 out of the barrel housing 20. The barrel housing 20 is provided with a positioning slot 30 for installing a positioning ring 18 which in turn engages with the adjusting knob 15. The positioning slot 30 and the positioning ring 18 serve a limiting device such that the adjusting knob 15 is restricted to displaced axially which in turn cause the supporting barrel 12 moves axially. The inner wall of the receiving chamber 28 of the barrel housing 20 is provided with a pair of guiding rails 19 corresponding to the guiding grooves 14 of the supporting barrel 12. The guiding rails 19 and the guiding grooves 14 can be slidably engaged to provide a guiding to the barrel housing 20. By this arrangement, the supporting barrel 12 is moved axially without rotating thereof. The stationary housing 21 of the barrel housing 20 is further provided with a threaded hole 32 having a locking screw 33 thereof.

When the lens assembly 10, the supporting barrel 12 and the adjusting knob 15 are installed to the barrel housing 20 of the scanner, the stationary housing 21 and the movable housing 22 can be assembled to complete the barrel housing 20. On the other hand, the dowel 23 and the dowel hole 24 serve the positioning device and a screw 27 can be locked into the thread hole 26 via the through hole 25. Then the assembling of the lens assembly with adjustable focusing arrangement is completed.

Figure 4:
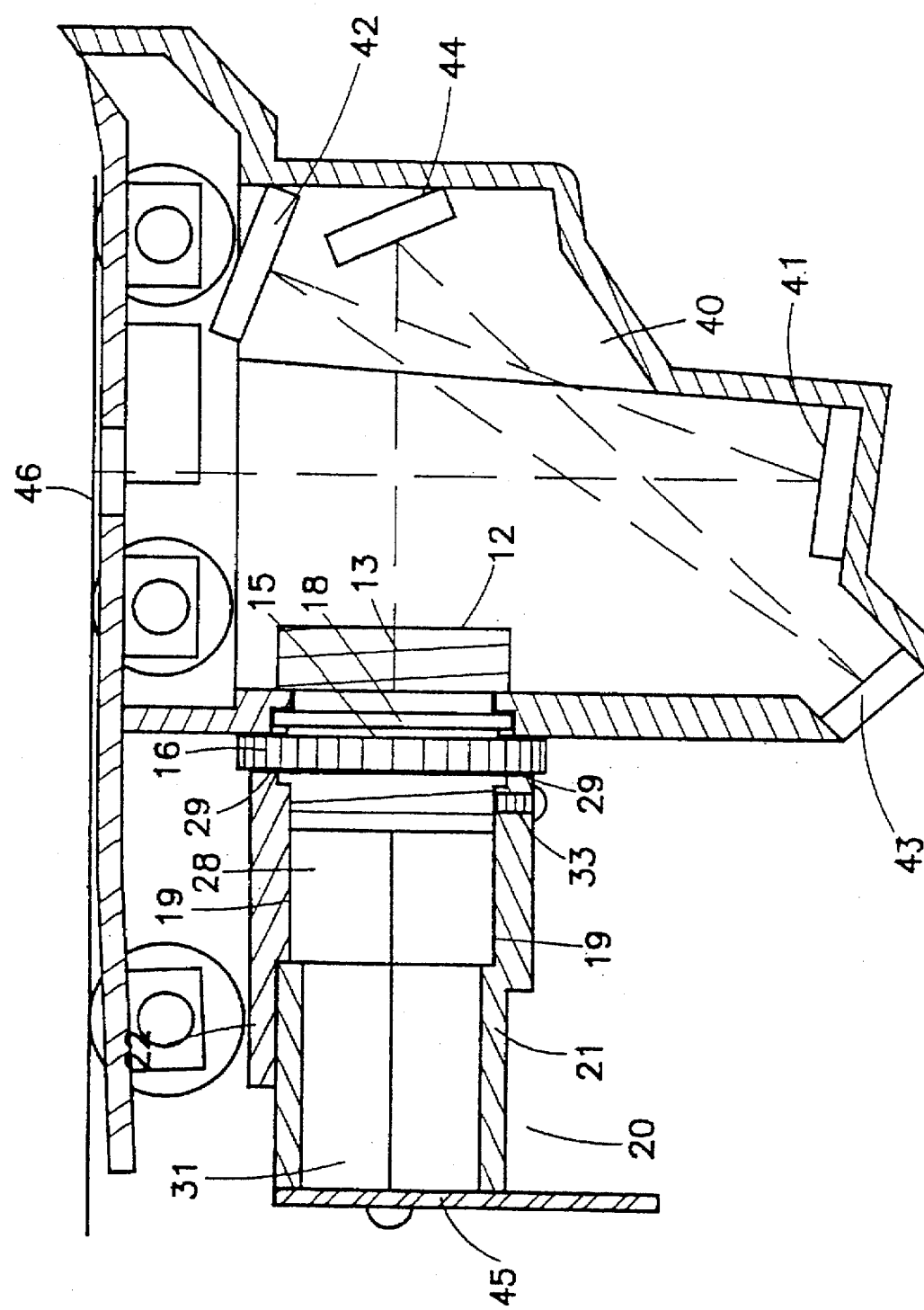
FIG. 4 is an schematic illustration showing the lens assembly with adjustable focusing arrangement is mounted on a scanner.

Referring to FIG. 4, a schematic illustration showing the lens assembly with adjustable focusing arrangement made according to this invention. The barrel housing 20 is connected to a lens chamber 40 which includes a plurality of lens units 41, 42, 43 and 44. In the front of the aperture 31 of the receiving chamber 28, a CCD element 45 is provided. When the document is transported by a conveying mechanism (not shown) and across the lens chamber 40. The alphanumeric information on the document 46 is reflected by the reflecting mirrors 41, 42, 43 and 44 and at last received by the CCD element 45 via the lens assembly 10. The CCD element 45 then converts the optical signal into the electric signal. No detailed description to the reflecting mirrors 41, 42, 43 and 44 and the CCD element 45 since there are known to the skilled in the art.

When the adjusting knob 15 is rotated, with the functional engagement between the inner thread 17 and the external thread 14 of the adjusting knob 15 and the supporting barrel 12, the supporting barrel 12 and the lens assembly 10 therein is moved up or down axially within the receiving chamber 28 of the barrel housing 20. By this arrangement, an optimal focus is therefore attained. Then the locking screw 33 can be locked to fix this focus. Since the adjusting knob 15 is readily accessed and rotated, the adjustment of the focus can be readily and accurately attained as compared with the conventional adjusting device. On the other hand, the lens assembly with adjustable focusing arrangement is also featured with a compact and simplified structure which can be assembled efficiently and cost-effectively.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A lens assembly with adjustable focusing arrangement comprising a lens assembly which includes a supporting barrel having the lens unit disposed therein, the outer wall of said supporting barrel being provided with external thread and a pair of guiding grooves extending lengthwise, an adjusting knob having an inner thread which is slidably engaged with said external thread of said barrel being provided, a barrel housing having a receiving chamber which receives said lens assembly, said supporting barrel and said adjusting knob and is defined by a stationary housing and a movable housing being provided, said barrel housing being provided with cutouts for readily accessing to said adjusting knob, a through hole being provided at said receiving chamber, the inner wall of said receiving chamber of said barrel housing being provided with a pair of guiding rails which is slidably engaged with said guiding groove of said supporting barrel, a locking screw being provided at said barrel housing for fixing the optimal focus, when said lens assembly, said supporting barrel and said adjusting knob being assembled into said barrel housing, said stationary housing and said movable housing being assembled to complete the barrel housing.

2. A lens assembly with adjustable focusing arrangement as recited in claim 1, wherein said adjusting knob is engaged with a positioning ring and said barrel housing is provided with a positioning slot corresponding to said adjusting knob.

3. A lens assembly with adjustable focusing arrangement as recited in claim 1, wherein said stationary housing and the movable housing are provided with dowel and dowel hole corresponding to each other and serve as positioning devices.

4. A lens assembly with adjustable focusing arrangement as recited in claim 1, wherein said stationary housing and said movable housing are also provided with through hole and threaded hole, a locking screw can be applied to fix said stationary housing and said movable housing.

* * * * *